(12) United States Patent
Lorenz

(10) Patent No.: US 7,607,064 B2
(45) Date of Patent: Oct. 20, 2009

(54) SERIAL ASYNCHRONOUS INTERFACE WITH SLIP CODING/DECODING AND CRC CHECKING IN THE TRANSMISSION AND RECEPTION PATHS

(75) Inventor: Rüdiger Lorenz, Dinslaken (DE)

(73) Assignee: Infineon Technologies AG, Munich (DE)

( * ) Notice: Subject to any disclaimer, the term of this patent is extended or adjusted under 35 U.S.C. 154(b) by 1128 days.

(21) Appl. No.: 10/910,534

(22) Filed: Aug. 3, 2004

(65) Prior Publication Data

US 2005/0058188 A1    Mar. 17, 2005

(30) Foreign Application Priority Data

Aug. 6, 2003   (DE) ................. 103 36 121

(51) Int. Cl.
*H03M 13/00* (2006.01)
(52) U.S. Cl. ..................... 714/752; 714/781
(58) Field of Classification Search ............ 714/755, 714/781; *H03M 13/09*
See application file for complete search history.

(56) References Cited

U.S. PATENT DOCUMENTS

| | | | | |
|---|---|---|---|---|
| 5,327,436 A * | 7/1994 | Miyazaki | .................... | 714/781 |
| 6,192,498 B1 * | 2/2001 | Arato | ......................... | 714/781 |
| 6,336,201 B1 * | 1/2002 | Geile et al. | ................. | 714/755 |
| 6,370,667 B1 * | 4/2002 | Maki | ........................... | 714/781 |
| 6,516,439 B2 * | 2/2003 | Kodama et al. | ............ | 714/781 |
| 6,851,086 B2 * | 2/2005 | Szymanski | .................. | 714/781 |
| 7,039,852 B2 * | 5/2006 | Dent | ........................... | 714/781 |
| 2002/0133781 A1 * | 9/2002 | Mikkola et al. | ............ | 714/781 |
| 2002/0144208 A1 * | 10/2002 | Gallezot et al. | ............ | 714/781 |
| 2002/0194571 A1 * | 12/2002 | Parr et al. | ................... | 714/781 |
| 2003/0093751 A1 * | 5/2003 | Hohl | ........................... | 714/781 |
| 2003/0212941 A1 * | 11/2003 | Gillies et al. | ................ | 714/726 |

OTHER PUBLICATIONS

Motorola: MC68360 Quad Integrated Communications Controller User's Manual, 61 pgs., internet search from Apr. 21, 2004, <URL:http//e-www.motorola.com/webapp/sps/site/prod_summary.jsp?code=MC68360&nodeId=016246PCbf0795#>.
Intel: CD2481 Programmable Four-Channel communications Controller Datasheet, May 2001, pp. 1-12, internet search: URL:<http://www.intel.com/design/interconnect/docs.htm>.

* cited by examiner

*Primary Examiner*—Scott T Baderman
*Assistant Examiner*—Sam Rizk
(74) *Attorney, Agent, or Firm*—Eschweiler & Associates, LLC

(57) ABSTRACT

A transmitting/receiving unit for asynchronous data transmission has a CRC unit and a transmission FIFO in a transmission path. A coding unit for SLIP-coding of data to be transmitted can optionally be connected in the transmission path. Furthermore, a CRC unit and a reception FIFO are arranged in the reception path of the module. A decoding unit for SLIP-decoding of received data can optionally be connected in the reception path. The unit is connected to a data bus, in which case a DMA unit can also be connected to the data bus.

18 Claims, 3 Drawing Sheets

SERIAL ASYNCHRONOUS INTERFACE WITH SLIP CODING/DECODING AND CRC CHECKING IN THE TRANSMISSION AND RECEPTION PATHS

REFERENCE TO RELATED APPLICATIONS

This application claims the benefit of the priority date of German application DE 103 36 121.9, filed on Aug. 6, 2003, the contents of which are herein incorporated by reference in their entirety.

FIELD OF THE INVENTION

The invention relates to a transmitting/receiving unit for asynchronous data transmission, in particular to a UART module for serial asynchronous data transmission, and to a method for asynchronous data transmission by means of such a transmitting/receiving unit.

BACKGROUND OF THE INVENTION

The increasing further developments of computer and telecommunications systems as well as peripheral equipment also require continuously increasing processor power and data transfer rates, to the same extent. Thus, for example, the amounts of data that are becoming ever larger for the transmission of images, speech and music via a network, such as the Internet, require very high data transmission rates and very high processor power levels. Further development of both the hardware components and of the software of such systems is thus a significant factor in order to make it possible to comply with the demanded requirements. The interfaces in computer or telecommunications systems such as these must, in particular, be continuously developed further in order to make it possible to transmit the large amounts of data as effectively and efficiently as possible between the modules of the system.

One interface that is known in computer and telecommunications systems is the UART interface (Universal Asynchronous Receiver and Transmitter). A UART interface such as this or a UART module such as this allows serial asynchronous data transmission, and is a module which allows serial and bit-oriented communication in a telecommunications system or in a computer system. The UART module allows the conversion of characters, which are received in parallel from the memory, to bit-oriented data streams using a specific protocol format and allows the opposite procedure on reception of data.

During the course of the development of such UART modules, three functional types have been created, which are referred to as unbuffered UART modules, as buffered UART modules and as DMA (Direct Memory Access) UART modules. The method of operation of unbuffered UART modules can be described as follows. In order to transmit a character, the character is stored by the processor unit (CPU=Central Processing Unit) in a hold register. The stored character is not shifted into a shift register until this shift register is being emptied. Until the time at which the character is transferred to the transmission shift register, the processor unit has to store a further character in the hold register, in order to guarantee further operation at full speed, in order to make it possible to transfer this further character directly from the hold register to the transmission shift register, if necessary. On the other hand, during reception, one bit is in each case transferred into the reception shift register. If a complete character is received, then it is transferred from the reception shift register to a hold register. The character then can be read by the processor unit from the reception shift register. If there are two or more received data items, then these data items are continuously shifted from the reception shift register to the hold register, which results in previous characters being overwritten in the hold register. If the processor unit has not yet read these previous characters, this data is lost.

In the case of buffered UART modules, the hold register that is used in unbuffered UART modules is replaced by a FIFO buffer (first-in-first-out buffer).

In contrast to unbuffered and buffered UART modules, DMA-UART modules use a DMA circuit arrangement which is integrated on a chip in order to transfer received data and data to be transmitted directly to the processor memory, without any action by the processor unit. It is thus possible to provide a very high performance level, with relatively little time being required for the processor unit. With this type of memory access, the task of the DMA module is thus to carry out the access process and to transfer the contents read from the memory via the system bus to other areas of the memory, or to peripheral modules. This procedure can be carried out more quickly than if the processor unit were itself to carry out the access and the transfer. In the case of a DMA-UART module, the processor unit only initiates the transfer via the DMA module.

The data to be transmitted or the data received is transmitted by means of communication protocols via the serial asynchronous interface or via the UART module. Communication protocols such as these include, for example, TCP/IP (Transfer Control Protocol/Internet Protocol), PPP (Point-to-Point Protocol), UDP (User Datagram Protocol), ICMP (Internet Control Message Protocol), IGP (Interior Gateway Protocol), EGP (Exterior Gateway Protocol), BGP (Border Gateway Protocol) etc.

More recent communication protocols for the serial asynchronous interface, such as the Bluetooth Standard 3-wire UART, use error identification and error correction algorithms for protection of the data communication, such as CRC (Cyclic Redundancy Check), and framing methods for synchronization, such as SLIP (Serial Line Internet Protocol). SLIP in this case denotes a protocol type that allows TCP and IP protocols to be transmitted via serial lines.

The conventional implementation of a UART interface or of a UART module is based on the use of a standard module or a standard IP that converts characters received in parallel form to serial, bit-oriented data streams in accordance with the UART specification. The data is not changed in the process. In general, the CRC checksums and the SLIP coding must be carried out by software or by means of a separate hardware module.

FIG. 1 illustrates one known implementation by means of software. FIG. 1 shows a processor unit PE which is electrically connected for data interchange purposes via an address bus AB and a data bus DB to one or more memory modules SP, for example RAM and/or ROM modules, and to a UART module. The UART module has a storage register SR, for example a FIFO storage register, and a monitoring unit SIE (Serial Interface Engine). The monitoring unit SIE checks the communication protocol (which is used for the data to be transmitted or the data received) for the asynchronous interface (physical layer), and is electrically connected to the storage register SR for data interchange purposes. In this software-based implementation of the UART interface, the code conversion and calculation of the CRC checksum involve a relatively high degree of software complexity. The code conversion and calculation of the CRC checksum must be carried out by the processor unit PE. Furthermore, it is impossible to use DMA controllers or DMA modules since, in this case, each individual byte must be processed.

The hardware-based implementation is illustrated in FIG. 2. In addition to the embodiment shown in FIG. 1, a DMA module in FIG. 2 is electrically connected to the address bus AB and to the data bus DB in order to interchange data with other modules on the chip or in the integrated circuit. Furthermore, this hardware-based implementation of a UART interface has a separate hardware module SHB. This separate hardware module SHB has a CRC unit for error identification and error correction, and a coding/decoding unit KE/DE. This known hardware-based embodiment of the UART interface can admittedly be implemented without any software complexity, but requires additional hardware components in the system. Particularly in the case of the illustrated embodiment with a DMA module, two channels must, however, be used for each transmission direction. One channel is in this case required for the data transfer from the memory SP to the units CRC and KE/DE, which are arranged in the separate hardware module SHB, and one channel is required for the data transfer from the separate hardware module SHB to the UART module.

The required complexity is relatively high both for the known software-based embodiment and for the known hardware-based embodiment. On the one hand, complex software is required, and on the other hand additional hardware modules and channels are required for the data transfer between the individual modules.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The invention is directed to a transmitting/receiving unit and a method for asynchronous data transmission, which can be implemented with reduced complexity.

A transmitting/receiving unit according to the invention for asynchronous data transmission comprises a coding unit and a decoding unit for coding of data to be transmitted and for decoding of received data, respectively. Furthermore, the transmitting/receiving unit in each case has one unit, which is arranged in the transmission path and in the reception path, for error identification and error correction of transmitted data. The transmitting/receiving unit is, in particular, in the form of a UART module for serial asynchronous data transmission.

The transmitting/receiving unit according to the invention makes it possible to considerably reduce the software and hardware complexity for implementation of an interface for asynchronous data transmission, in particular for serial asynchronous data transmission. This is achieved by integrating or arranging both the units for error identification and error correction of the transmission path and of the reception path as well as the coding unit and the decoding unit in the transmitting/receiving unit. Furthermore, this makes it possible to avoid complex interchange of data via at least two channels, as has been explained in the prior art according to FIG. 2.

In one particularly advantageous embodiment, the coding unit can be connected in the transmission path as a function of coding, which may need to be carried out, of data to be transmitted, and the decoding unit can be connected in the reception path as a function of decoding, which may need to be carried out, of received data. The coding unit that is arranged in the transmitting/receiving unit and/or the decoding unit that is arranged in the transmitting/receiving unit can thus optionally be connected in the transmission path or in the reception path, respectively. This is in this case dependent on the requirement for coding of the data to be transmitted or for decoding received data. Since the coding unit and/or the decoding unit can be connected in the transmission path or reception path, respectively, coding or decoding of data can thus be carried out automatically, when necessary.

Advantageously, the coding unit is connected downstream from the unit for error identification and error correction in the transmission path if coding of data to be transmitted is being carried out, and the decoding unit is connected upstream of the unit for error identification and error correction in the reception path, if decoding of received data is being carried out.

It is preferable if the unit for error identification and error correction in the transmission path is electrically connected to a transmission storage register, in particular to a transmission FIFO, and the coding unit is connected in the transmission path between the unit for error identification and error correction and the transmission storage register if coding of data to be transmitted is being carried out.

It has likewise been found to be advantageous if the unit for error identification and error correction in the reception path is electrically connected to a reception storage register, in particular to a reception FIFO, and the decoding unit is connected in the reception path between the unit for error identification and error correction and the reception storage register if decoding of received data is being carried out.

It is possible to provide that the transmission storage register in the transmission path and the reception storage register in the reception path are electrically connected to a monitoring unit for checking communication protocols, with the monitoring unit being arranged or integrated in particular in the transmitting/receiving unit. It is advantageous if the coding unit and the decoding unit are respectively designed for SLIP coding and decoding.

The units for error identification and error correction may be in the form of CRC units, and may be connected to a data bus line.

It is advantageous for a DMA unit to be electrically connected to a data bus line. The transmitting/receiving unit according to the invention also makes it possible to use a DMA module for direct memory access, in addition to the transmitting/receiving unit.

This makes it possible for a CRC unit and a SLIP unit in each case to be connected in series both in the transmission path and in the reception path of the transmitting/receiving unit, so that the SLIP coding or decoding and the checking of the signals by means of CRC checksums are carried out automatically. The respective units are in this case arranged directly in the transmitting/receiving unit or in the UART module, thus making it possible to ensure particularly effective and low-complexity signal processing.

In a method according to the invention for asynchronous data transmission by means of a transmitting/receiving unit as described above, error identification and error correction of data to be transmitted and of received data are carried out in the transmission path and in the reception path of the transmitting/receiving unit. Furthermore, any coding which may be required for the data to be transmitted and decoding of the received data are carried out in the transmitting/receiving unit. The steps of error checking and of error correction that may result from this are thus carried out in the transmitting/ receiving unit itself, in the method according to the invention. Furthermore, any coding or decoding which may be required of data to be transmitted or received data is likewise carried out in the transmitting/receiving unit itself. These two steps of error checking and correction as well as coding/decoding can thus be implemented with little complexity, by carrying them out directly in the transmitting/receiving unit.

It has been found to be advantageous if the received data is automatically decoded by a microprocessor reading a reception storage register and, if required, error identification and error correction are carried out automatically.

It is preferable if the data to be transmitted is automatically coded by writing data to be transmitted from a microprocessor to the transmission storage register and, if required, for a checking code such as a CRC checksum to be calculated in a CRC unit, with this checksum then being checked in a CRC unit in the receiving unit.

Advantageously, a coding unit for coding the data to be transmitted is connected in the transmission path of the transmitting/receiving unit. It is possible to provide that the coding unit is connected in the transmission path downstream from a unit for error identification and error correction, and upstream of a transmission storage register, in particular a transmission FIFO.

It is also possible to provide that a decoding unit for decoding of the received data is connected in the reception path of the transmitting/receiving unit. Preferably, the decoding unit is connected in the reception path upstream of a unit for error identification and error correction, and downstream from a reception storage register, in particular a reception FIFO.

Preferably, the data to be transmitted and the received data are respectively SLIP-coded and SLIP-decoded. Advantageously, at least two bytes are stored in the reception storage register for SLIP decoding of received SLIP-coded data bytes. It is possible to provide for the error identification and the error correction to be carried out by means of a CRC algorithm. It is advantageously possible to provide for a DMA module to be electrically connected to the transmitting/receiving unit.

BRIEF DESCRIPTION OF THE DRAWINGS

One exemplary embodiment of the invention will be explained in more detail in the following text with reference to schematic drawings, in which.

DETAILED DESCRIPTION OF THE INVENTION

Identical or functionally identical elements are provided with the same reference symbols in the figures.

Figure 1:
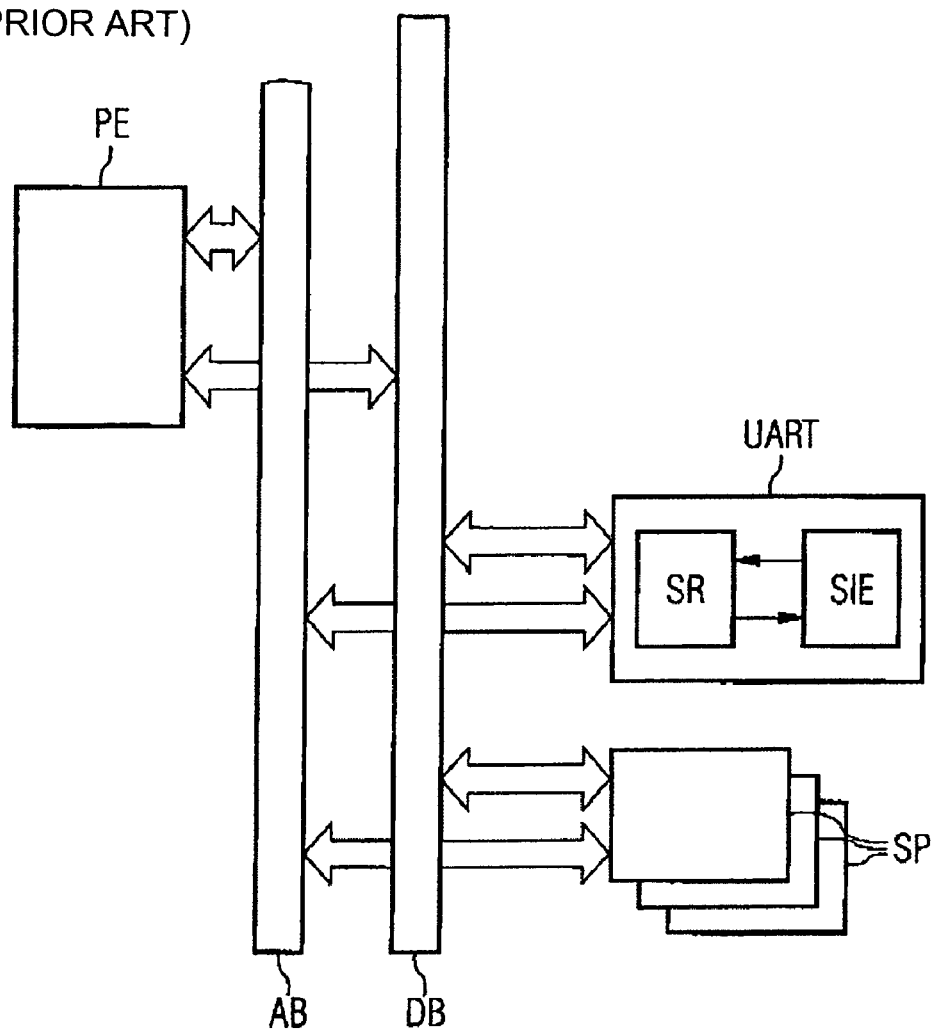
FIG. 1 shows a block diagram of a known software-based implementation of a UART interface.
Figure 2:
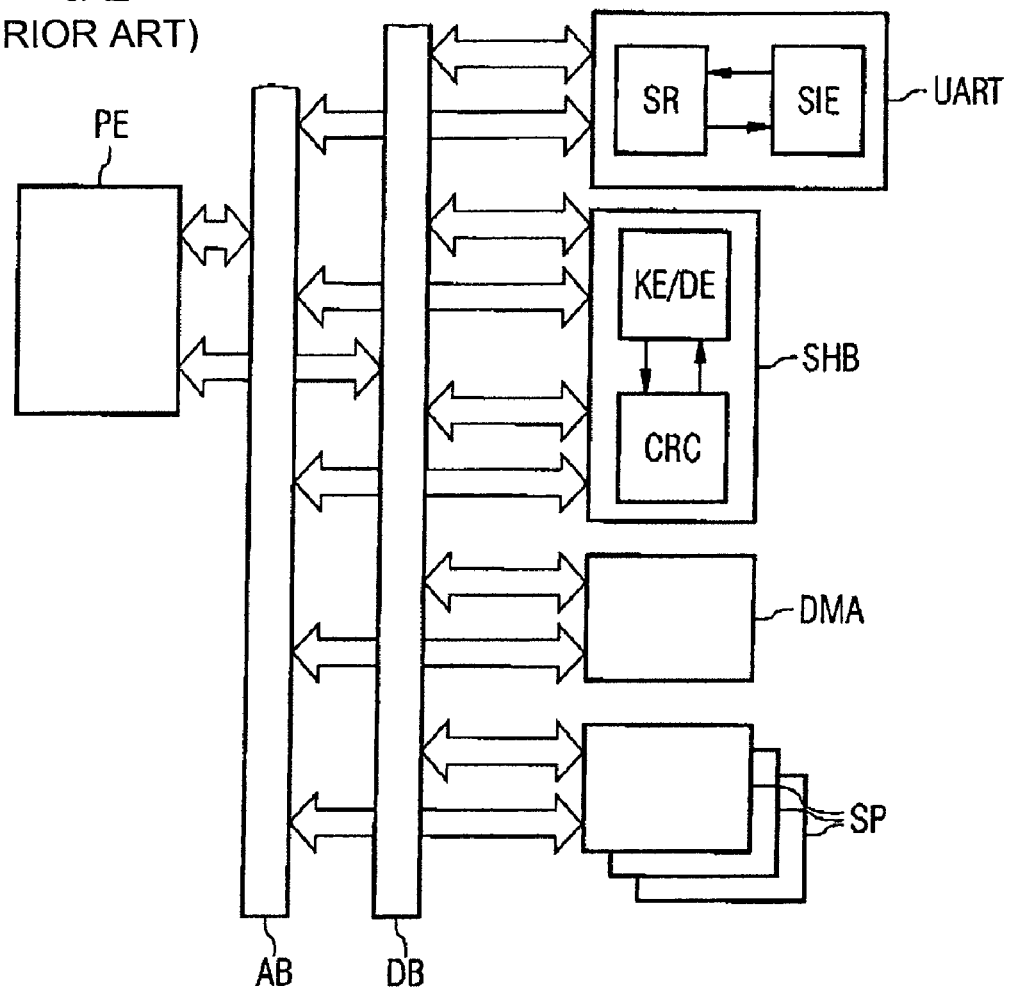
FIG. 2 shows a block diagram of a known hardware-based implementation of a UART interface.
Figure 3:
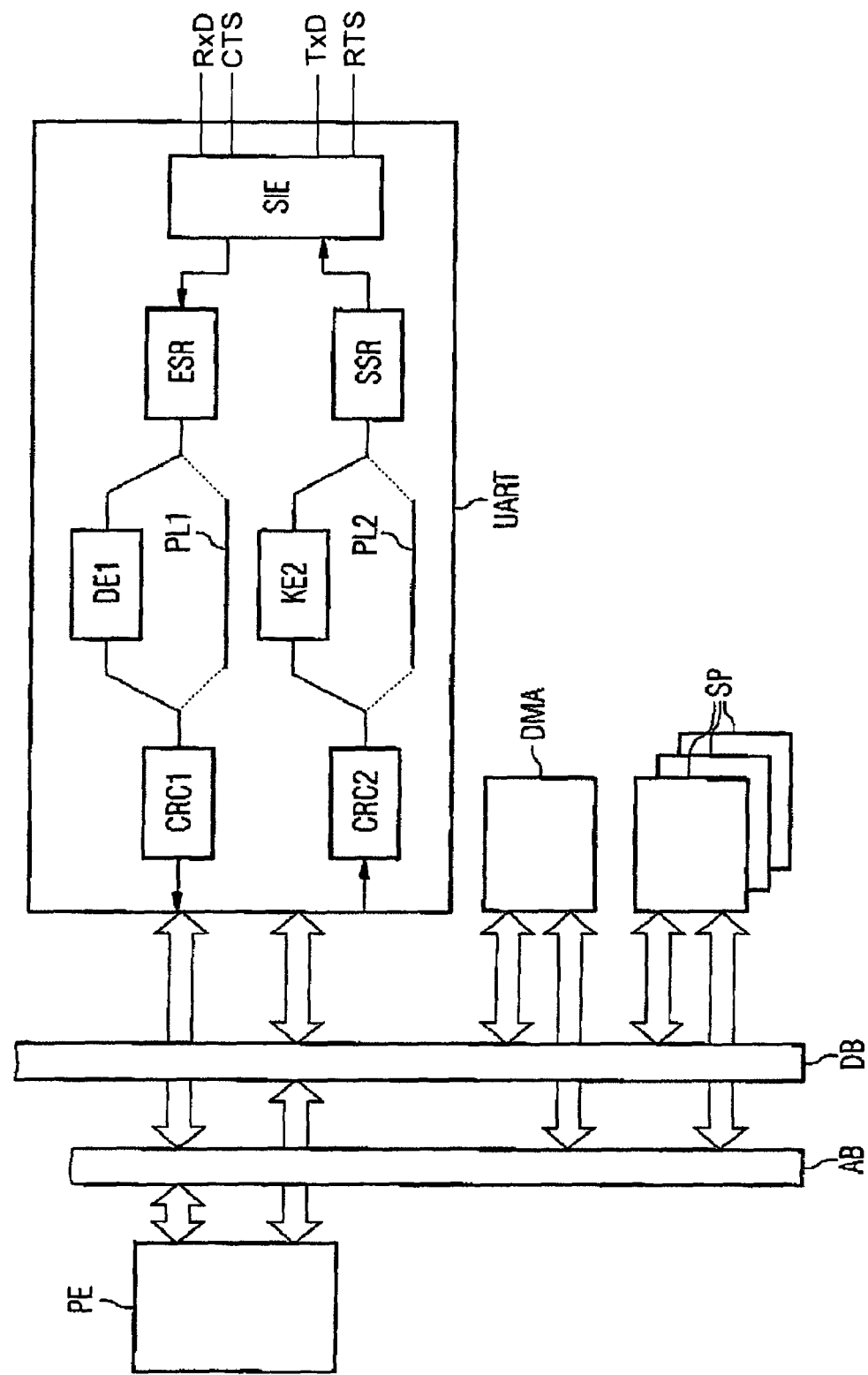
FIG. 3 shows a block diagram of one implementation of a transmitting/receiving module for asynchronous data transmission according to the invention.

The exemplary embodiment in FIG. 3 shows a schematic illustration of a UART module according to the invention for implementation of an interface for serial asynchronous data transmission. The processor unit PE, the memory SP and the DMA unit correspond to the units that are also illustrated in FIG. 2. The UART module according to the invention comprises a reception path in which a first reception storage register ESR as a reception FIFO and a first unit for error identification and error correction CRC1 are arranged. The reception path of the UART module furthermore comprises a decoding unit DE1, which can optionally be connected in the reception path. In the illustration shown in the exemplary embodiment in FIG. 3, the decoding unit DE1 is connected in the reception path. The decoding unit is in this case arranged in the reception path such that it is connected downstream from the reception FIFO ESR and upstream of the unit CRC1. If there is no need to decode received data, the decoding unit DE1 can also be disconnected from the reception path. In this case, the unit CRC1 is electrically connected to the reception FIFO ESR via the signal line PL1. The output of the unit CRC1 is electrically connected via the data bus DB and the address bus AB to the processor unit PE. Furthermore, the input of the reception FIFO ESR is electrically connected to a monitoring unit SIE for checking the communication protocols that are used for the transmission of data.

One input of this unit SIE (Serial Interface Engine) is electrically connected to the transmission path of the UART module. The transmission path comprises a unit for error identification and error correction CRC2, and a transmission storage register SSR which in the exemplary embodiment is in the form of a transmission FIFO. A coding unit KE2 can optionally be connected in the transmission path. The illustration in FIG. 3 shows the situation in which this coding unit KE2 is connected in the transmission path. The coding unit KE2 is in this case connected downstream from the unit CRC2, and upstream of the transmission FIFO SSR. If there is no need for coding of the data to be transmitted, then the coding unit KE2 can be disconnected from the transmission path. In this case, the unit CRC2 is electrically connected to the transmission FIFO SSR via the signal line PL2.

The input of the unit CRC2 is electrically connected via the address bus AB and the data bus DB to the processor unit PE. Furthermore, the output of the transmission FIFO SSR is electrically connected to the input of the monitoring unit SIE. In the UART module according to the invention, the units for error identification and error correction CRC1 and CRC2 are thus arranged directly in the transmission path and in the reception path, respectively, and are integrated in the UART module. The coding and decoding units KE2 and DE1 are likewise arranged in the UART module, and can be connected in the transmission path and in the reception path, respectively, as required. The reception FIFO ESR, the decoding unit DE1 and the unit CRC1 are then connected in series in the reception path. The unit CRC2, the coding unit KE2 and the transmission FIFO SSR are likewise connected in series for coding of data to be transmitted.

This arrangement of the unit CRC1, of the decoding unit DE1 and of the reception FIFO ESR in the reception path means that a CRC check is carried out automatically, and a decoding is optionally carried out automatically when the processor unit PE reads the received data from the reception FIFO ESR. The arrangement of the unit CRC2, of the coding unit KE2 and of the transmission FIFO SSR in the transmission path likewise means that a CRC check is carried out automatically and coding of the data is optionally carried out automatically when data to be transmitted is written to the transmission FIFO SSR. In the exemplary embodiment, the data to be transmitted is SLIP coded in the coding unit KE2 before being written to the transmission FIFO SSR. All that is necessary is thus to write the appropriate raw data from the processor unit PE to the transmission FIFO. The CRC check and the SLIP coding are carried out automatically during this process, as already mentioned. The data may also be CSLIP (Compressed Serial Line Internet Protocol)-coded.

In the exemplary embodiment, when SLIP-coded data is received, this received SLIP-coded data is first of all written to the reception FIFO ESR via the monitoring unit SIE. When this data is read from the reception FIFO ESR by the processor unit PE, then it is first of all SLIP-decoded in the decoding unit DE1 on the signal path in the reception path, and the decoded data is then subjected to a CRC check. Two bytes are provided for decoding of the received data in the reception FIFO ESR, in order to make it possible to map the SLIP-coded received data onto decoded data. If the received data sequence is not a SLIP sequence, then the decoded data byte corresponds to the received data byte, and can thus be read for at least one byte in the reception FIFO ESR. If the received data sequence is a SLIP sequence, then at least one second byte is required in order to make it possible to decode the SLIP sequence. Decoding and CRC checking are thus also carried out automatically when received data is read from the reception FIFO ESR by the processor unit PE.

The monitoring unit SIE has two further outputs TxD and RTS (Ready To Send), which are not illustrated, as well as two inputs RxD and CTS (Clear To Send), which are not illustrated. The data to be transmitted is transmitted via the output TxD and, for example, is transmitted to a digital signal processor. The received data is transmitted to the SIE unit via the input RxD.

The signal which is transmitted via the connection RTS of the SIE unit or of the UART module indicates, for example to a modulator/demodulator, that data for transmission is being provided via the UART module. The modulator/demodulator informs the transmitting unit via the connection CTS of the SIE unit that its buffer store is empty, and that the data to be transmitted can be received.

The transmitting/receiving unit according to the invention for asynchronous data transmission, in particular the UART module, makes it possible in a simple and low-complexity manner to carry out both error identification and error correction as well as any coding which may need to be carried out of data to be transmitted and/or decoding of received data in the module or in the transmitting/receiving unit itself. The units that are required for this purpose are integrated in an appropriate manner in the reception path and in the transmission path of the transmitting/receiving unit and, in the case of the coding unit KE2 and of the decoding unit DE1, can optionally be connected in the transmission path and in the reception path respectively.

The transmitting/receiving unit according to the invention as well as the method for asynchronous data transmission thus allow automatic error identification and error correction and, when required, additionally automatic coding of data to be transmitted, if the processor unit PE writes this transmission data to the transmission FIFO SSR. In a corresponding manner, the transmitting/receiving unit and the method for asynchronous data transmission also allow automatic error identification and error correction and, if required, additionally automatic decoding of received data, if the processor unit PE reads this received data from the reception FIFO ESR. It is advantageously still possible to use a DMA unit in the system, with this DMA unit being electrically connected via a data bus DB to the transmitting/receiving unit according to the invention.

Although the invention has been illustrated and described with respect to one or more implementations, alterations and/or modifications may be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A transmitting/receiving unit for asynchronous data transmission, comprising:
   a monitoring unit configured to check communication protocols of data to be received or to be transmitted, where the monitoring unit has an output for data to be transmitted and an input for data to be received;
   a transmission path of the transmitting/receiving unit comprising a first error identification and error correction unit that is coupled to a coding unit, wherein the coding unit is coupled a transmission storage register, and wherein the storage register is coupled to the monitoring unit; and
   a reception path of the transmitting/receiving unit comprising the monitoring unit which is further coupled to a reception storage register, wherein the reception storage register is coupled to a decoding unit, and wherein the decoding unit is coupled to a second error identification and error correction unit.

2. The transmitting/receiving unit of claim 1, wherein the coding unit is selectively connected in the transmission path as a function of a coding requirement of data to be transmitted, and the decoding unit is selectively connected in the reception path as a function of a decoding requirement of received data.

3. The transmitting/receiving unit of claim 1, wherein the coding unit is connected downstream from the first error identification and error correction unit in the transmission path if coding of data to be transmitted is required, and the decoding unit is connected upstream of the second error identification and error correction unit in the reception path if decoding of received data is required.

4. The transmitting/receiving unit of claim 1, wherein the first error identification and error correction unit in the transmission path is electrically coupled to a transmission storage register, and the coding unit is coupled in the transmission path between the first error identification and error correction unit and a transmission storage register if coding of data to be transmitted is to be performed.

5. The transmitting/receiving unit of claim 1, wherein the second error identification and error correction unit in the reception path is electrically coupled to a reception storage register, and the decoding unit is connected in the reception path between the second error identification and error correction unit and the reception storage register if decoding of received data is to be performed.

6. The transmitting/receiving unit of claim 1, wherein the transmission storage register in the transmission path and the reception storage register in the reception path are electrically connected to a monitoring unit configured to check communication protocols, wherein the monitoring unit is arranged in the transmitting/receiving module.

7. The transmitting/receiving unit of claim 1, wherein the coding unit and the decoding unit are respectively designed for SLIP coding and decoding.

8. The transmitting/receiving unit of claim 1, wherein the first and second error identification and error correction units comprise cyclic redundancy check (CRC) units.

9. The transmitting/receiving unit of claim 1, wherein the first and second error identification and error correction units are configured to be connected to a data bus line external to the transmitting/receiving unit.

10. The transmitting/receiving unit of claim 1, in combination with a DMA unit electrically connected to a data bus line, wherein the DMA unit is operably coupled to the first and second error identification and error correction units in the transmitting/receiving unit via the data bus line.

11. A transceiver, comprising:
a reception storage register configured to store received data therein;
a received data error identification and correction unit configured to identify and correct errors associated with the received data;
a decoding unit configured to be selectively coupled and decoupled between the reception storage register and the received data error identification and correction unit, and configured to decode received data from the reception storage register if the received data is coded, wherein the reception storage register, the received data error identification and correction unit and the decoding unit comprise a reception path of the transceiver;
a transmission storage register;
a transmission data error identification and correction unit configured to identify and correct errors associated with data to be transmitted; and
a coding unit selectively coupled between the transmission storage register and the transmission data error identification and correction unit, and configured to code data to be transmitted from the transmission data error and correction unit if the data to be transmitted is to be coded, wherein the transmission data error and correction unit, the transmission storage register, and the transmission data error identification and correction unit comprise a transmission path of the transceiver.

12. The transceiver of claim 11, further comprising:
a monitoring unit coupled to the reception storage register and the transmission storage register, and configured to check communication protocols and facilitate reception of data to the transceiver and transmission of data from the transceiver, respectively.

13. The transceiver of claim 11, wherein the reception storage register and the transmission storage register each comprise a first-in, first-out memory (FIFO).

14. A method of asynchronous data transmission, comprising:
receiving data and storing such received data in a reception storage register within a transceiver device;
selectively decoding the received data if the received data is coded data within the transceiver device;
receiving the decoded data or the data from the reception storage register, and performing an error identification and correction of the received data within the transceiver device;
performing an error identification and correction of data to be transmitted within the transceiver device;
selectively coding the data to be transmitted after the error identification and correction thereof if the data to be transmitted is to be coded within the transceiver device; and
storing the data to be transmitted in a transmission storage register within the transceiver device after the selective coding thereof.

15. The method of claim 14, wherein the received data is automatically decoded upon a reading of the reception storage register (ESR) and, if required, error identification and error correction are carried out automatically after the decoding.

16. The method of claim 14, wherein the error identification and the error correction for received data and data to be transmitted comprises identifying and correcting errors using a cyclic redundancy check (CRC) algorithm.

17. A method of asynchronous data transmission, comprising:
receiving data and storing such received data in a reception storage register within a transceiver device;
selectively decoding the received data if the received data is coded data within the transceiver device;
receiving the decoded data or the data from the reception storage register, and performing an error identification and correction of the received data within the transceiver device;
performing an error identification and correction of data to be transmitted within the transceiver device;
selectively coding the data to be transmitted after the error identification and correction thereof if the data to be transmitted is to be coded within the transceiver device;
storing the data to be transmitted in a transmission storage register within the transceiver device after the selective coding thereof; and
wherein the data to be transmitted is automatically analyzed and errors identified and corrected automatically, if required, and coded automatically, if required, prior to be written to the transmission storage register.

18. A method of asynchronous data transmission, comprising:
receiving data and storing such received data in a reception storage register within a transceiver device;
selectively decoding the received data if the received data is coded data within the transceiver device;
receiving the decoded data or the data from the reception storage register, and performing an error identification and correction of the received data within the transceiver device;
performing an error identification and correction of data to be transmitted within the transceiver device;
selectively coding the data to be transmitted after the error identification and correction thereof if the data to be transmitted is to be coded within the transceiver device;
storing the data to be transmitted in a transmission storage register within the transceiver device after the selective coding thereof;
wherein the data to be transmitted and the received data are respectively SLIP-coded and SLIP-decoded; and
storing at least two bytes in the reception storage register, and using the at least two bytes for SLIP decoding of received SLIP coded data bytes in the reception storage register.

* * * * *